US012185315B2

(12) United States Patent
Zhou et al.

(10) Patent No.: US 12,185,315 B2
(45) Date of Patent: Dec. 31, 2024

(54) MECHANISMS FOR BANDWIDTH PART (BWP) SWITCHING IN A NEW RADIO (NR) NETWORK

(71) Applicant: Apple Inc., Cupertino, CA (US)

(72) Inventors: Yuhan Zhou, La Jolla, CA (US); Rui Huang, Beijing (CN); Yang Tang, San Jose, CA (US); Hua Li, Beijing (CN); Jie Cui, San Jose, CA (US); Qiming Li, Beijing (CN)

(73) Assignee: Apple Inc., Cupertino, CA (US)

( * ) Notice: Subject to any disclaimer, the term of this patent is extended or adjusted under 35 U.S.C. 154(b) by 621 days.

(21) Appl. No.: 17/286,606

(22) PCT Filed: Nov. 4, 2019

(86) PCT No.: PCT/US2019/059717
§ 371 (c)(1),
(2) Date: Apr. 19, 2021

(87) PCT Pub. No.: WO2020/096987
PCT Pub. Date: May 14, 2020

(65) Prior Publication Data
US 2021/0377988 A1  Dec. 2, 2021

Related U.S. Application Data

(60) Provisional application No. 62/755,999, filed on Nov. 5, 2018.

(51) Int. Cl.
H04W 72/20  (2023.01)
(52) U.S. Cl.
CPC ................. H04W 72/20 (2023.01)

(58) Field of Classification Search
CPC ..... H04L 5/0007; H04L 5/001; H04L 5/0096; H04W 56/0045; H04W 72/20
See application file for complete search history.

(56) References Cited

U.S. PATENT DOCUMENTS 11,019,544 B2 *  5/2021  Moon ............... H04B 7/088
11,064,434 B2 *  7/2021  Lin ................. H04W 52/0225
(Continued)

FOREIGN PATENT DOCUMENTS

WO  2015047951 A2  4/2015

OTHER PUBLICATIONS

U.S. Appl. No. 62/671,261, filed 2018.*
(Continued)

Primary Examiner — Dung B Huynh
(74) Attorney, Agent, or Firm — Eschweiler & Potashnik, LLC

(57) ABSTRACT

A device of a New Radio (NR) User Equipment (UE), a system, a method and a machine-readable medium. The device includes a radio frequency (RF) interface and processing circuitry coupled to the RF interface. The processing circuitry is to: cause communication with a NR evolved Node B (gNodeB) on a first bandwidth part (BWP); determine a BWP switching delay for an uplink (UL) communication from the UE to the gNodeB, the BWP switching delay based on a timing advance (TA) for the UL communication; encode the UL communication for transmission to the gNodeB; switch from the first BWP to a second BWP at an expiration of the BWP switching delay; and cause transmission of the UL communication on the second BWP.

19 Claims, 4 Drawing Sheets

(56) References Cited

U.S. PATENT DOCUMENTS

| | | | | |
|---|---|---|---|---|
| 11,564,222 | B2* | 1/2023 | Uchino | H04W 48/16 |
| 11,800,477 | B2* | 10/2023 | Jiang | H04W 56/0015 |
| 2018/0220345 | A1* | 8/2018 | Moon | H04W 36/04 |
| 2018/0368112 | A1* | 12/2018 | Sebeni | H04W 72/23 |
| 2019/0090299 | A1* | 3/2019 | Ang | H04W 52/0229 |
| 2019/0149308 | A1* | 5/2019 | Son | H04L 5/0007 |
| | | | | 375/260 |
| 2019/0158229 | A1* | 5/2019 | Wei | H04L 1/1848 |
| 2019/0191399 | A1* | 6/2019 | Islam | H04W 72/046 |
| 2019/0200396 | A1* | 6/2019 | Agiwal | H04L 41/0654 |
| 2019/0215048 | A1* | 7/2019 | Cirik | H04B 7/0626 |
| 2019/0215870 | A1* | 7/2019 | Babaei | H04L 5/0092 |
| 2019/0215900 | A1* | 7/2019 | Pan | H04W 72/23 |
| 2019/0222404 | A1* | 7/2019 | Ang | H04L 5/0096 |
| 2019/0230590 | A1* | 7/2019 | Wu | H04W 52/0274 |
| 2019/0253966 | A1* | 8/2019 | Park | H04L 5/00 |
| 2019/0268869 | A1* | 8/2019 | Akkarakaran | H04W 72/0446 |
| 2019/0268905 | A1* | 8/2019 | Zhou | H04W 72/23 |
| 2019/0281504 | A1* | 9/2019 | Su | H04W 76/28 |
| 2019/0289513 | A1* | 9/2019 | Jeon | H04W 36/06 |
| 2019/0296805 | A1* | 9/2019 | Son | H04W 76/27 |
| 2019/0297577 | A1* | 9/2019 | Lin | H04W 52/0229 |
| 2019/0305916 | A1* | 10/2019 | Liao | H04L 5/0092 |
| 2019/0312635 | A1* | 10/2019 | Ang | H04B 7/2634 |
| 2019/0349060 | A1* | 11/2019 | Liao | H04B 7/0695 |
| 2019/0349815 | A1* | 11/2019 | Tiirola | H04W 72/12 |
| 2019/0349983 | A1* | 11/2019 | Loehr | H04W 80/02 |
| 2019/0357085 | A1* | 11/2019 | Chervyakov | H04L 1/0009 |
| 2019/0394710 | A1* | 12/2019 | Ugurlu | H04L 5/0098 |
| 2020/0014523 | A1* | 1/2020 | Huang | H04L 5/001 |
| 2020/0029315 | A1* | 1/2020 | Lin | H04W 24/08 |
| 2020/0037246 | A1* | 1/2020 | Hwang | H04W 52/0216 |
| 2020/0037247 | A1* | 1/2020 | Liao | H04W 52/0216 |
| 2020/0052782 | A1* | 2/2020 | Wang | H04W 74/006 |
| 2020/0053768 | A1* | 2/2020 | Chen | H04W 88/04 |
| 2020/0100178 | A1* | 3/2020 | Kim | H04W 52/0216 |
| 2020/0107265 | A1* | 4/2020 | Hwang | H04W 72/51 |
| 2020/0107308 | A1* | 4/2020 | Liao | H04W 72/12 |
| 2020/0120584 | A1* | 4/2020 | Yi | H04L 5/005 |
| 2020/0127786 | A1* | 4/2020 | Kwak | H04B 7/0417 |
| 2020/0128427 | A1* | 4/2020 | Hwang | H04L 5/001 |
| 2020/0137718 | A1* | 4/2020 | Agiwal | H04W 68/02 |
| 2020/0213066 | A1* | 7/2020 | Ma | H04L 43/0876 |
| 2020/0229089 | A1* | 7/2020 | Tang | H04L 5/001 |
| 2020/0274750 | A1* | 8/2020 | Yi | H04L 27/2659 |
| 2020/0275398 | A1* | 8/2020 | Da | H04L 5/0092 |
| 2020/0275485 | A1* | 8/2020 | Babaei | H04W 74/0808 |
| 2020/0280970 | A1* | 9/2020 | Takeda | H04L 5/0098 |
| 2020/0288463 | A1* | 9/2020 | Lee | H04W 72/569 |
| 2020/0304274 | A1* | 9/2020 | Matsumura | H04L 5/0092 |
| 2020/0313832 | A1* | 10/2020 | Kim | H04L 5/0098 |
| 2020/0329463 | A1* | 10/2020 | Shi | H04W 72/23 |
| 2020/0337011 | A1* | 10/2020 | Jiang | H04W 56/0045 |
| 2020/0351064 | A1* | 11/2020 | Shi | H04L 5/0044 |
| 2020/0351638 | A1* | 11/2020 | Kim | H04W 8/24 |
| 2020/0351837 | A1* | 11/2020 | Hwang | H04L 1/1812 |
| 2020/0351946 | A1* | 11/2020 | Pang | H04W 72/0453 |
| 2020/0374844 | A1* | 11/2020 | Takeda | H04L 27/2602 |
| 2020/0374923 | A1* | 11/2020 | Cheng | H04L 5/0092 |
| 2020/0389282 | A1* | 12/2020 | Turtinen | H04W 74/02 |
| 2020/0389922 | A1* | 12/2020 | Xu | H04W 76/27 |
| 2021/0014008 | A1* | 1/2021 | Takeda | H04L 1/0001 |
| 2021/0044408 | A1* | 2/2021 | Kubota | H04W 72/23 |
| 2021/0058964 | A1* | 2/2021 | Hooli | H04W 74/008 |
| 2021/0099902 | A1* | 4/2021 | Takeda | H04W 24/10 |
| 2021/0112431 | A1* | 4/2021 | Kazmi | H04W 76/18 |
| 2021/0167930 | A1* | 6/2021 | Jeon | H04L 27/2607 |
| 2021/0168807 | A1* | 6/2021 | Jung | H04L 27/00 |
| 2021/0175935 | A1* | 6/2021 | Kwon | H04B 7/0413 |
| 2021/0219112 | A1* | 7/2021 | Shilov | H04W 72/0453 |
| 2021/0242995 | A1* | 8/2021 | Noh | H04W 72/1273 |
| 2021/0314982 | A1* | 10/2021 | Panteleev | H04L 5/0053 |
| 2021/0320774 | A1* | 10/2021 | Park | H04L 5/0023 |
| 2021/0392531 | A1* | 12/2021 | Lu | H04W 52/146 |
| 2021/0392609 | A1* | 12/2021 | Siomina | H04W 64/00 |
| 2021/0410079 | A1* | 12/2021 | MolavianJazi | H04W 52/44 |
| 2022/0015185 | A1* | 1/2022 | Jiang | H04W 52/0216 |
| 2022/0039130 | A1* | 2/2022 | Zhou | H04W 72/1273 |
| 2022/0124657 | A1* | 4/2022 | Baldemair | H04W 56/0015 |
| 2022/0400459 | A1* | 12/2022 | Turtinen | H04W 56/001 |

OTHER PUBLICATIONS

U.S. Appl. No. 62/755,117, filed 2018.*
U.S. Appl. No. 62/703,008, filed 2018.*
U.S. Appl. No. 62/754,700, filed 2018.*
PCT Search Report dated Apr. 7, 2020 in connection with PCT Application No. PCT/US2019/059717.
PCT Written Opinion dated Apr. 7, 2020 in connection with PCT Application No. PCT/US2019/059717.
Intel Corporation, On remaining issues for BWP switching Delay, R4-1814534, 3GPP TSG RAN WG4 Meeting #89, Spokane, USA, Nov. 2, 2018 sections 2-3; and Table 3, 8.6.2-1.
ETSI TS 138.133 V15.3.0 (2018-10), 5G; NR; Requirements for support of radio resource management (3GPP TS 38.133 version 15.3.0 Release 15) Oct. 3, 2018 Table 8.2.2.2.5-1.
Intel Corporation, On remaining issues for interruption due to BWP switching, R4-1814537 3GPP TSG RAN WG4 Meeting #89, Spokane, USA, Nov. 2, 2018 sections 2-3; and Table 2.
Mediatek Inc., 'Remaining Issues on BWP Switch Delay', R4-1814900, 3GPP TSG RAN Meeting #89, Spokane, USA, Nov. 2, 2018 sections 2-3.

\* cited by examiner

MECHANISMS FOR BANDWIDTH PART (BWP) SWITCHING IN A NEW RADIO (NR) NETWORK

CROSS REFERENCE TO RELATED APPLICATIONS

This application is a National Phase entry application of International Patent Application No. PCT/US2019/059717 filed Nov. 4, 2019, which claims the benefit of and priority from U.S. Provisional Patent Application No. 62/755,999 entitled "ON THE REQUIREMENT FOR BWP SWITCHING," filed Nov. 5, 2018, the entire disclosures of which is incorporated herein by reference.

FIELD

Various embodiments generally relate to the field of cellular communications, and particularly to bandwidth part (BWP) switching.

BACKGROUND

Current Third Generation Partnership Project (3GPP) New Radio (NR) specifications (or 5G specifications) do not specifically address issues related to timing requirements in BWP switching specific to uplink (UL) communications.

DETAILED DESCRIPTION

Figure 1:
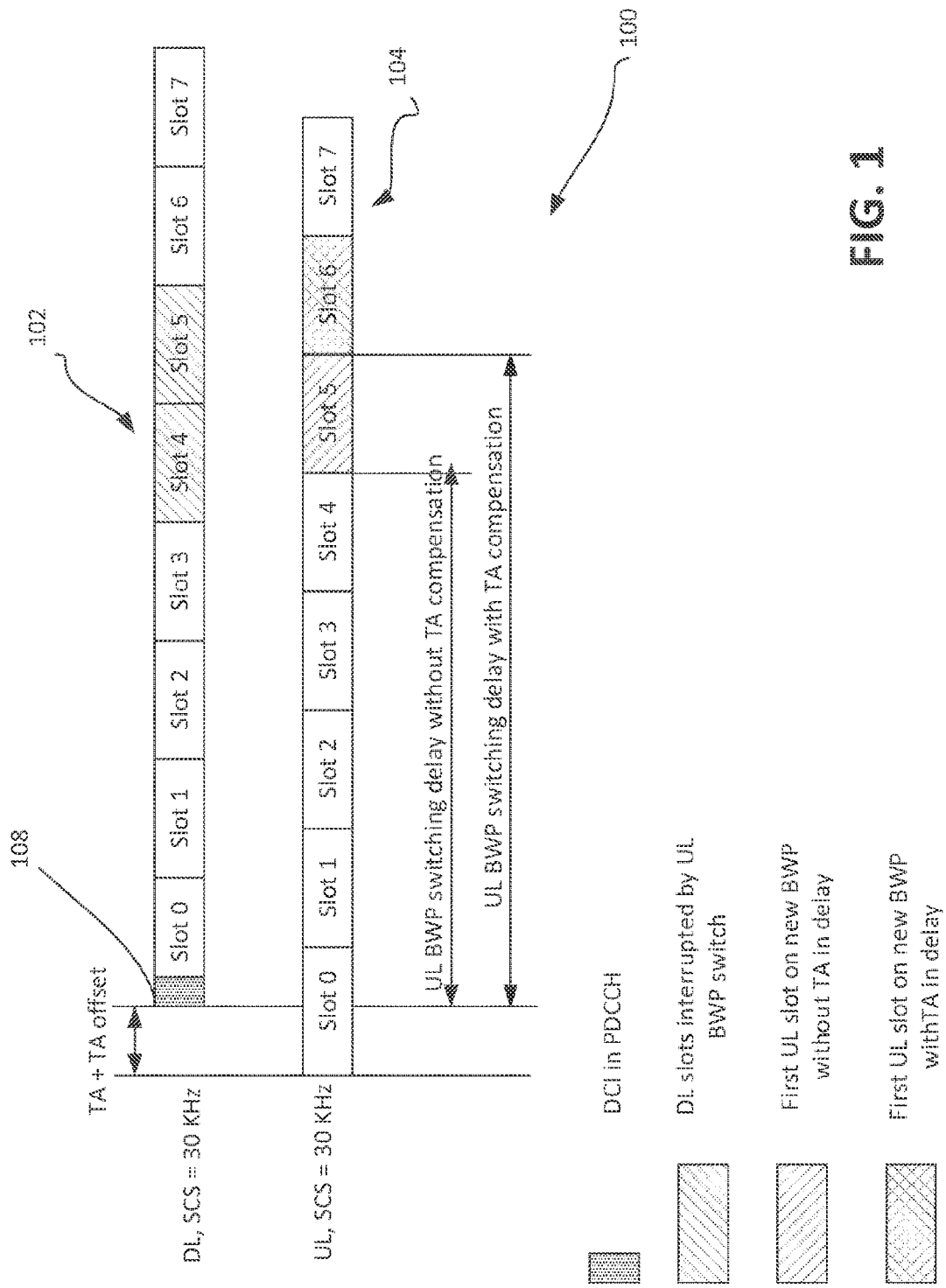
FIG. 1 illustrates radio communications in a downlink control information (DCI) based BWP switching context according to one embodiment.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

A user equipment (UE) and next generation base station NR evolved Node B (gNB or gNodeB) may perform bandwidth part (BWP) switching, in which the bandwidth of a component carrier is divided into multiple bandwidth parts and the UE and/or gNodebB may switch between different BWPs for downlink and/or uplink signals. The BWP in current use for downlink and/or uplink may be referred to as the active BWP. The switching of the active BWP may be triggered by any suitable mechanism, such as by a downlink control information (DCI) message received by the UE from the gNodeB, and/or expiration of a timer.

Described herein are requirements for BWP switching, such as the BWP switching delay requirement in uplink (UL) transmissions, the interruption requirement for intra-band Evolved Universal Mobile Telecommunications System (UMTS) Terrestrial Radio Access (E-UTRA) New Radio Dual Connectivity (EN-DC) and Carrier Aggregation (CA), and/or the interruption to the carrier in the same serving cell for frequency division duplexing (FDD) mode. These requirements may be incorporated in a future version of 3GPP's Technical Specification (TS) 38.133.

Example #1

According to a first example, the bandwidth part (BWP) switching delay requirement for UL transmission defined in TS38.133 should take timing advance (TA) into account.

The BWP switching delay requirement captured in current version of TS 38.133 is as follows:

"For DC-based BWP switch, after the UE receives BWP switching request at slot n on a serving cell, UE shall be able to receive PDSCH (for DL active BWP switch) or transmit PUSCH (for UL active BWP switch) on the new BWP on the serving cell on which BWP switch occurs no later than at slot $n+T_{BWPswitchDelay}$.

For timer-based BWP switch, the UE shall start BWP switch at slot n, where n is the beginning of a subframe (FR1) or half-subframe (FR2) immediately after a BWP-inactivity timer bwp-InactivityTimer [2] expires on a serving cell, and the UE shall be able to receive PDSCH (for DL active BWP switch) or transmit PUSCH (for UL active BWP switch) on the new BWP on the serving cell on which BWP switch occurs no later than at slot $n+T_{BWPswitchDelay}$.

The UE is not required to transmit UL signals or receive DL signals during time duration $T_{BWPswitchDelay}$ on the cell where DCI-based BWP switch or timer-based BWP switch occurs.

Depending on UE capability bwp-SwitchingDelay [2], UE shall finish BWP switch within the time duration $T_{BWPswitchDelay}$ defined in Table 8.6.2-1.

TABLE 8.6.2-1

| | | BWP switch delay | |
|---|---|---|---|
| | NR Slot length | BWP switch delay $T_{BWPswitchDelay}$ (slots) | |
| μ | (ms) | Type 1[Note 1] | Type 2[Note 1] |
| 0 | 1 | [1] | [3] |
| 1 | 0.5 | [2] | [5] |
| 2 | 0.25 | [3] | [9] |
| 3 | 0.125 | [6] | [17] |

Note 1:
Depends on UE capability.
Note 2:
If the BWP switch involves changing of SCS, the BWP switch delay is determined by the larger one between the SCS before BWP switch and the SCS after BWP switch.

The BWP switching delay requirement determined after RAN4 #88bis is specified in Table 8.6.2-1 in TS38.133. The actual time for BWP switching is 600 μs+3 OFDM symbols for Type 1 delay and 2000 μs+3 OFDM symbols for Type 2 delay depending on UE capability, and the same requirement applies to scenarios 1/2/3/4 for BWP switching.

One issue on the existing BWP switching delay requirement is that the delay requirements for UL and DL are not separated, which may cause confusion. Theoretically, the BWP switching delay duration should be the same for UL and DL. However, since the UL timing is earlier than DL timing by the value of timing advance (TA), the starting and end time of the BWP switching delay for DL and UL will effectively be in different slots. Thus, it is beneficial to separate the BWP switching delay requirement for UL and DL.

FIG. 1 illustrates radio transmissions 100 including a DL transmission 102 and an UL transmission 104, illustrating an example of DCI-based BWP switching for UL transmission in frequency division duplexing (FDD) mode. According to TS38.133:

"For DCI-based BWP switch, after the UE receives BWP switching request at slot n on a serving cell, UE shall be able to receive PDSCH (for DL active BWP switch) or transmit PUSCH (for UL active BWP switch) on the new BWP on the serving cell on which BWP switch occurs no later than at slot n+$T_{BWPswitchDelay}$."

FIG. 1 illustrates the starting and ending time for UL DCI-based BWP switching in a carrier with 30 kHz subcarrier spacing (SCS) for a Type 2 delay FDD mode. Based on TS38.122, in FIG. 1, DCI 108 includes a BWP switching request at slot 0. In this case, the UE of FIG. 1 shall be able to receive physical downlink shared channel (PDSCH) or transmit physical uplink shared channel (PUSCH) on the new BWP on which BWP switch occurs no later than slot 0+$T_{BWPswitchDelay}$ which, for µ=1 (30 KHz subcarrier spacing (SCS) for Type 2 equals 5 slots. Thus, the UE shall be able to receive PDSCH or send PUSCH at slot 0+5 slots=at slot 5. If the DCI command is received in a physical downlink control channel (PDCCH) at DL slot 0, BWP switching is defined to start at DL slot 0. Without compensating the TA value, the UE is required to transmit PUSCH on the new active UL BWP at UL slot 5. Accordingly, the total BWP switching time for UL is shortened due to the existing of TA which is not taken into account for the UL transmission. The TA value should be compensated in the BWP switch delay requirement for UL transmission. As shown in FIG. 1, for example with a Type 2 delay requirement (2000 µs+3 OFDM symbols), a UE would be required to transmit PUSCH on the new active UL BWP at UL slot 6 (instead of slot 5) according to one embodiment.

Example #2

According to a second example, when a BWP switch occurs in UL and the UE operates on FDD mode, after UE receives BWP switching request at DL slot n (for DCI-based BWP switch), or the BWP-inactivity timer expires at DL slot n (for timer-based BWP switch), UE shall, according to one embodiment, be able to transmit PUSCH (for UL active BWP switch) on the new BWP no later than at UL slot n+$T_{BWPswitchDelay}$+Y, where $T_{BWPswitchDelay}$ defined in Table 8.6.2-1 in TS38.133 as set forth above.

There are two options for values of Y. According to Option 1, Y equals to the smallest number of slots (depending on SCS) that are longer in time than (TA+TA offset). According to Option 2, Y is calculated by taking into account the existing margin in BWP switching delay. In Option 2:
  Y equals zero if (TA+TA offset)<X;
  Y equals the smallest number of slots (depending on SCS) that are longer than (TA+TA offset−X) if (TA+TA offset)≥X.
  where X is defined in Table 1 shown below.

TABLE 1

X values for UL BWP switching delay

| SCS | For Type 1 Delay UE (µs) | For Type 2 Delay UE (µs) |
|---|---|---|
| 15 kHz | 185.82 | 784.72 |
| 30 kHz | 292.83 | 392.35 |
| 60 kHz | 96.41 | 196.17 |
| 120 kHz | 123.22 | 98.10 |

The value of TA equals $(N_{TA}+N_{TAoffset}) \times T_C$ and the maximum TA value is given in TS 38.213, as shown in Table 2. Table 2 shows that for 30 kHz SCS, the maximum TA is 1.01 ms. With this TA value, UE only has 5−2=3 slots (where the 2 in the equation corresponds to the TA time of 1.01 ms) to complete BWP switching, which is infeasible. Thus, it can be seen that depending on the value of TA, the delay requirement without compensating TA may not be achievable for UL BWP switching. Longer delay time is needed for BWP switching in UL to compensate the impact of TA.

TABLE 2

Maximum TA value for different SCS

| SCS | Maximum $N_{TA}$ ($T_C$) | Maximum $N_{TA\,offset}$ ($T_C$) | maximum TA (ms) |
|---|---|---|---|
| 15 kHz | 3938304 | 25600 | 2.02 |
| 30 kHz | 1969152 | 25600 | 1.01 |
| 60 kHz | 984576 | 13792 | 0.51 |
| 120 kHz | 492288 | 13792 | 0.26 |

Since the actual time for BWP switching is 600 µs+3 OFDM symbols for Type 1 delay and 2000 µs+3 OFDM symbols for Type 2 delay, there exists some time margin in the existing delay requirement, that is, a 11 OFDM symbols margin for Type 2 delay. One option is to use this margin to compensate a part of TA value and the remaining part of TA (if it is positive) is the difference between UL and DL BWP switching delay. With this option, one also needs to consider the TA adjustment accuracy specified in TS38.133 (shown in Table 2). The TA adjustment accuracy should be excluded from the time margin before compensating TA. Another option is just to use the entire TA value as the difference between UL and DL BWP switching delay.

TABLE 3

UE Timing Advance adjustment accuracy

| | Sub Carrier Spacing, SCS kHz | | | |
|---|---|---|---|---|
| | 15 | 30 | 60 | 120 |
| UE Timing Advance adjustment accuracy | ±256 $T_c$ | ±256 $T_c$ | ±128 $T_c$ | ±32 $T_c$ |

Example #3

When a UE operates in FDD mode, a BWP switch in DL (or UL) carrier would cause interruption to the corresponding UL (or DL) carriers. The interruption requirement (number of slots allowed in which interruption can occur) is, according to an embodiment, the same as BWP switching in inter-band carrier aggregation (CA) specified in Table 4 from TS38.133:

TABLE 4

| μ | NR Slot length (ms) | Interruption length (slots[note 1]) |
|---|---|---|
| 0 | 1 | 1 |
| 1 | 0.5 | 1 |
| 2 | 0.25 | 3 |
| 3 | 0.125 | 5 | note 1:
If the BWP switch involves changing of SCS, the interruption due to BWP switch is determined by the larger one between the SCS before BWP switch and the SCS after the BWP switch.

As it is shown in FIG. 1 by way of example, the DL slot #5 and slot #6 are interrupted due to the UL BWP switching. The interruption duration time is 500 μs, which is the RF tuning time, and corresponds to the 1 slot interruption length as set forth in Table 4 above. The interruption duration should follow the same requirement as the scenario where BWP switches occurs in one NR serving cell and causes interruption to the other serving cells in inter-band CA.

In the current version of TS38.133, the interruption is only specified for different serving cells, which is stated as follows:

"When UE receives a DCI indicating UE to switch its NR active BWP, the UE is allowed to cause interruption of up to X slot to other active serving cells if the UE is not capable of per-FR gap, or if the BWP switching involves SCS changing . . . "

Accordingly, various embodiments described herein provide interruption for BWP switch in the same carrier (cell) as described above.

Example #4

The interruption on E-UTRA primary cell (PCell) or on any activated E-UTRA secondary cells (SCell(s)) due to BWP switching in any NR serving cell shall be, according to one embodiment:

2 subframes in intra-band synchronous E-UTRA New Radio Dual Connectivity (EN-DC); and 3 subframes in intra-band asynchronous EN-DC.

When BWP switch occurs on the NR serving cell in NR CA, the UE is allowed to cause interruption of up to Y on the other active serving cell for intra-band CA. When BWP switch occurs on the NR serving cell in EN-DC, the UE is allowed to cause interruption of up to Y on PCell or on the other active SCell for intra-band EN-DC. Y is defined in Table 5.

TABLE 5

| μ | NR Slot length (ms) | Interruption length |
|---|---|---|
| 0 | 1 | 2 |
| 1 | 0.5 | 2 |
| 2 | 0.25 | 4 |
| 3 | 0.125 | 6 |

The interruption time duration is the time for RF tuning in the NR cell on which BWP switching occurs, and RF tuning time is 500 μs for RF1 and 250 μs for FR2. The interruption duration from the NR cell on which BWP switching occurs may be 500 μs for simplicity according to one embodiment, although another value may be used.

One more issue to be considered for intra-band case is the time for automatic gain control (AGC) settling. For inter-band, two separate RF chains may be employed to operate at different CCs, while in an intra-band contiguous case, UE may adopt one single RF chain for receiving data from two CCs. In such a case, when the UE switches BWP and thus changes the received signal strength indicator (RSSI) dramatically, the AGC might need to be re-settled for data reception. Being different from SCell activation, where the AGC is adjusted based on synchronization signal block (SSB), it is not reasonable to assume SSB-based or channel state information-reference signal (CSI-RS)-based AGC settling after BWP switching since there is no guarantee that the network will configure SSB or periodic CSI-RS in the first slot on a new BWP. Thus, embodiments propose adopting RSSI-based AGC adjustment in this case. As a result, one more slot is required for AGC settling according to one embodiment.

Example #5

According to another example, the MIMO layer RRC signaling may be per-CC based.

In the current Layer 1 (L1) configuration, there is no explicit maximum multiple-input multiple-output (MIMO) layer configuration on per component carrier (CC) level signaled via radio resource control (RRC) to the UE by the network. It was discussed in RAN2 that the maximum MIMO layer configuration of a CC may be derived from existing information elements (IEs) within the RRC configuration with either a per-CC or a per-BWP granularity. If the parameters are configured in a per-BWP fashion, radio frequency (RF)/baseband resource remapping becomes a requirement during BWP switching time, in which case the existing BWP switching delay requirement would need to be extended accordingly. Furthermore, if changing MIMO layer related parameters requires RF tuning, interruptions would be allowed during the BWP switching time according to an embodiment.

According to a first option, the existing RRC signaling does not include MIMO layer signaling information, in which case the existing BWP switching delay requirements would not take into account the MIMO layer reconfiguration.

According to a second option, if MIMO layer configuration is on per-BWP manner, extra time is needed and configured according to an embodiment for the UE to reconfigure firmware and resources to accommodate the different MIMO layer configurations during BWP switching delay.

According to third option, when BWP switch involves changing MIMO layer configuration, UE is allowed to cause interruptions during the BWP switching time according to one embodiment.

Figure 2:
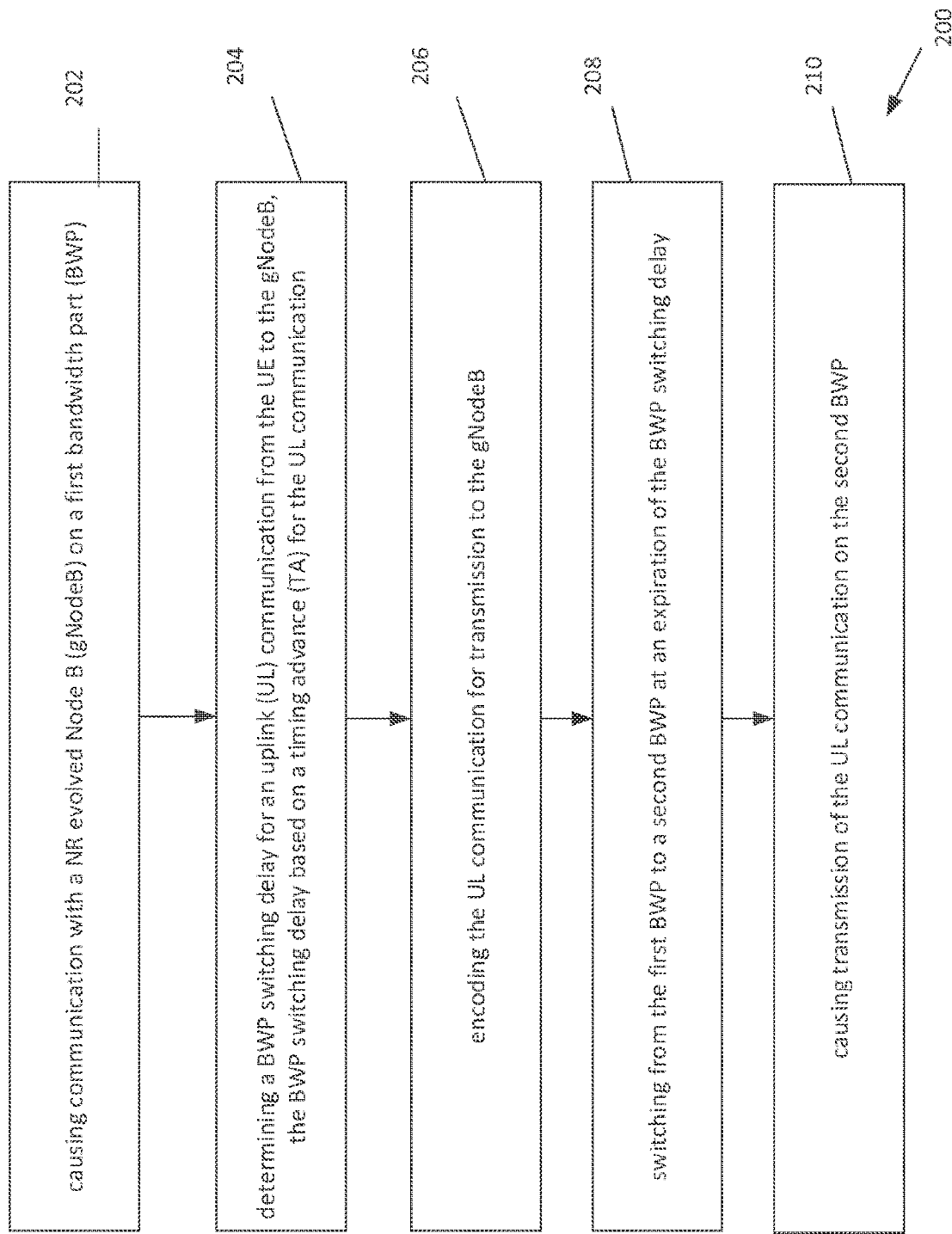
FIG. 2 illustrates a process according to one embodiment.

FIG. 2 illustrates a process 200 according to an embodiment. Process 200 includes, at operation 202, causing communication with a NR evolved Node B (gNodeB) on a first bandwidth part (BWP); at operation 204, determining a BWP switching delay for an uplink (UL) communication from the UE to the gNodeB, the BWP switching delay based on a timing advance (TA) for the UL communication; at operation 206, encoding the UL communication for transmission to the gNodeB; at operation 208, switching from the first BWP to a second BWP at an expiration of the BWP switching delay; and at operation 210, causing transmission of the UL communication on the second BWP.

Figure 3:
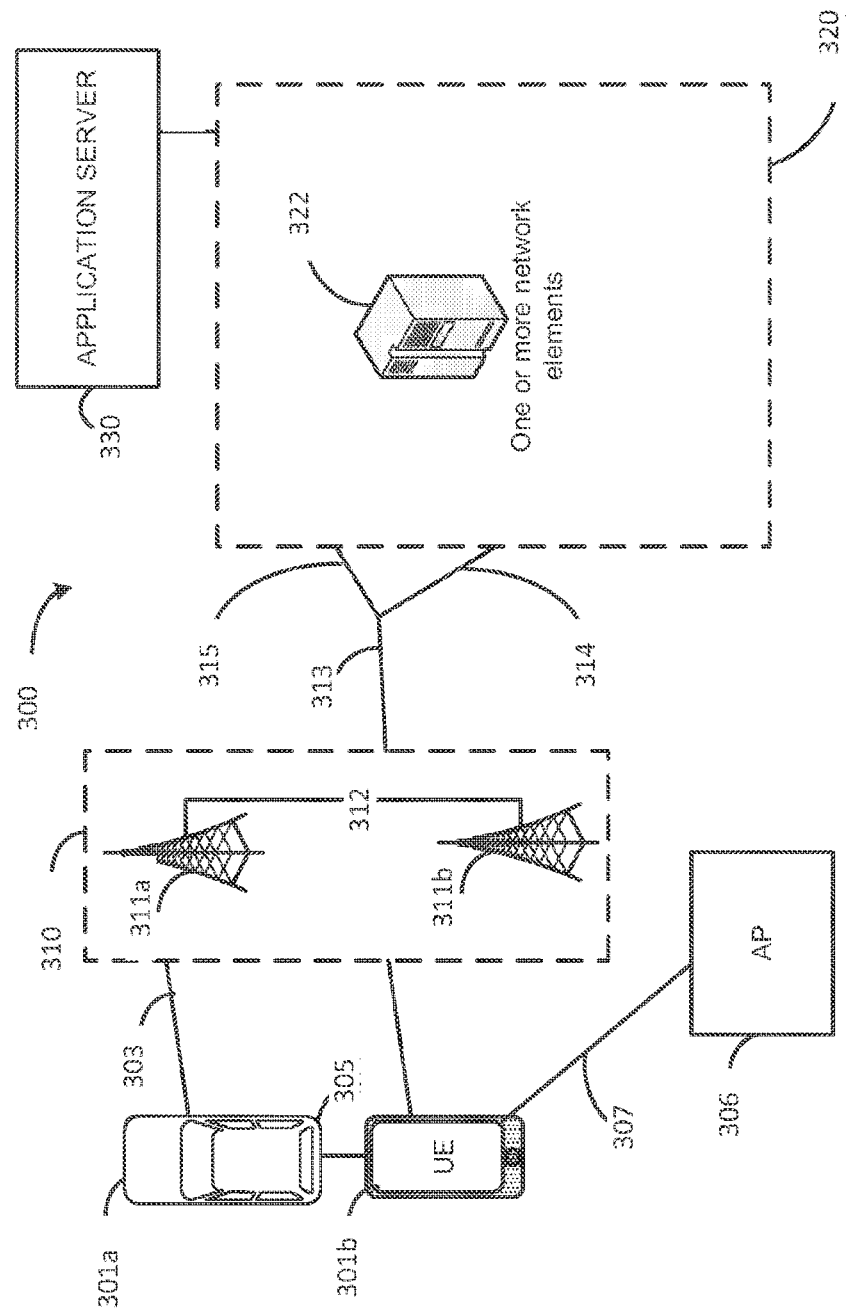
FIG. 3 illustrates an example architecture of a system of a network, in accordance with various embodiments.

FIG. 3 illustrates an example architecture of a system 300 of a network, in accordance with various embodiments. The following description is provided for an example system 300 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 3, the system 300 includes UE 301a and UE 301b (collectively referred to as "UEs 301" or "UE 301"). In this example, UEs 301 are illustrated as smartphones, but may also comprise any mobile or non-mobile computing device.

The UEs 301 may be configured to connect, for example, communicatively couple, with an or RAN 310. In embodiments, the RAN 310 may be an NG RAN or a 5G RAN, an E-UTRAN, or a legacy RAN, such as a UTRAN or GERAN. As used herein, the term "NG RAN" or the like may refer to a RAN 310 that operates in an NR or 5G system 300, and the term "E-UTRAN" or the like may refer to a RAN 310 that operates in an LTE or 4G system 300. The UEs 301 utilize connections (or channels) 303 and 304, respectively, each of which comprises a physical communications interface or layer (discussed in further detail below).

In this example, the connections 303 and 304 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 301 may directly exchange communication data via a ProSe interface 305. The ProSe interface 305 may alternatively be referred to as a SL interface 305 and may comprise one or more logical channels, including but not limited to a PSCCH, a PSSCH, a PSDCH, and a PSBCH.

The UE 301b is shown to be configured to access an AP 306 (also referred to as "WLAN node 306," "WLAN 306," "WLAN Termination 306," "WT 306" or the like) via connection 307.

The connection 307 can comprise a local wireless connection, such as a connection consistent with any IEEE 802.11 protocol, wherein the AP 306 would comprise a wireless fidelity (Wi-Fi®) router. In this example, the AP 306 is shown to be connected to the Internet without connecting to the core network of the wireless system (described in further detail below).

The RAN 310 can include one or more AN nodes or RAN nodes 311a and 311b (collectively referred to as "RAN nodes 311" or "RAN node 311") that enable the connections 303 and 304. As used herein, the terms "access node," "access point," or the like may describe equipment that provides the radio baseband functions for data and/or voice connectivity between a network and one or more users. These access nodes can be referred to as BS, NR evolved NodeBs (gNodeBs), RAN nodes, eNBs, NodeBs, RSUs, TRxPs or TRPs, and so forth. As used herein, the term "NG RAN node" or the like may refer to a RAN node 311 that operates in an NR or 5G system 300 (for example, a gNB), and the term "E-UTRAN node" or the like may refer to a RAN node 311 that operates in an LTE or 4G system 300 (e.g., an eNB). According to various embodiments, the RAN nodes 311 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In embodiments, the UEs 301 can be configured to communicate using OFDM communication signals with each other or with any of the RAN nodes 311 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 311 to the UEs 301, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 301 and the RAN nodes 311, 312 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

The RAN nodes 311 may be configured to communicate with one another via interface 312. In embodiments where the system 300 is a 5G or NR system, the interface 312 may be an Xn interface 312. The Xn interface is defined between two or more RAN nodes 311 (e.g., two or more gNodeBs or gNBs and the like) that connect to 5GC 320, between a RAN node 311 (e.g., a gNB) connecting to 5GC 320 and an eNB, and/or between two eNBs connecting to 5GC 320.

The RAN 310 is shown to be communicatively coupled to a core network—in this embodiment, core network (CN) 320. The CN 320 may comprise a plurality of network elements 322, which are configured to offer various data and telecommunications services to customers/subscribers (e.g., users of UEs 301) who are connected to the CN 320 via the RAN 310. The components of the CN 320 may be implemented in one physical node or separate physical nodes including components to read and execute instructions from a machine-readable or computer-readable medium (e.g., a non-transitory machine-readable storage medium).

Generally, the application server 330 may be an element offering applications that use IP bearer resources with the core network (e.g., UMTS PS domain, LTE PS data services, etc.). The application server 330 can also be configured to support one or more communication services (e.g., VoIP sessions, PTT sessions, group communication sessions, social networking services, etc.) for the UEs 301 via the EPC 320.

In embodiments, the CN 320 may be a 5GC (referred to as "5GC 320" or the like), and the RAN 310 may be connected with the CN 320 via an NG interface 313. In embodiments, the NG interface 313 may be split into two parts, an NG user plane (NG-U) interface 314, which carries traffic data between the RAN nodes 311 and a UPF, and the S1 control plane (NG-C) interface 315, which is a signaling interface between the RAN nodes 311 and AMFs.

In embodiments, the CN 320 may be a 5G CN (referred to as "5GC 320" or the like), while in other embodiments, the CN 320 may be an EPC). Where CN 320 is an EPC (referred to as "EPC 320" or the like), the RAN 310 may be connected with the CN 320 via an S1 interface 313. In embodiments, the S1 interface 313 may be split into two parts, an S1 user plane (S1-U) interface 314, which carries traffic data between the RAN nodes 311 and the S-GW, and the S1-MME interface 315, which is a signaling interface between the RAN nodes 311 and MMEs.

Figure 4:
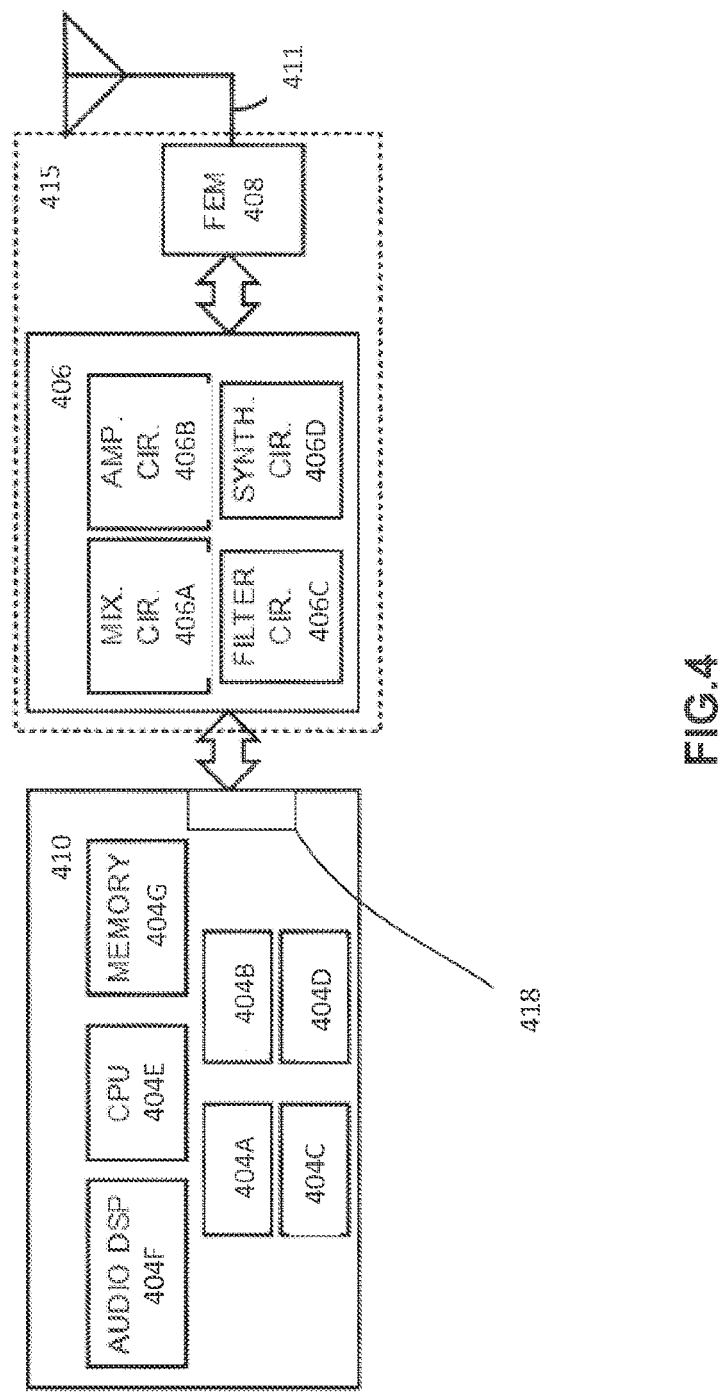
FIG. 4 illustrates example components of baseband circuitry and radio front end modules (RFEM) in accordance with various embodiments.

FIG. 4 illustrates example components of baseband circuitry 410 and radio front end modules (RFEM) 415 in accordance with various embodiments. Baseband circuitry 410 includes a RF interface 418 connecting it to the RFEM. As shown, the RFEMs 415 may include Radio Frequency (RF) circuitry 406, front-end module (FEM) circuitry 408, antenna array 411 coupled together at least as shown.

The baseband circuitry 410 includes circuitry and/or control logic configured to carry out various radio/network protocol and radio control functions that enable communication with one or more radio networks via the RF circuitry 406. The radio control functions may include, but are not limited to, signal modulation/demodulation, encoding/decoding, radio frequency shifting, etc. In some embodiments, modulation/demodulation circuitry of the baseband circuitry 410 may include Fast-Fourier Transform (FFT), precoding, or constellation mapping/demapping functionality. In some embodiments, encoding/decoding circuitry of the baseband circuitry 410 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 410 is configured to process baseband signals received from a receive signal path of the RF circuitry 406 and to generate baseband signals for a transmit signal path of the RF circuitry 406. The baseband circuitry 410 is configured to interface with an application circuitry for generation and processing of the baseband signals and for controlling operations of the RF circuitry 406. The baseband circuitry 410 may handle various radio control functions.

The aforementioned circuitry and/or control logic of the baseband circuitry 410 may include one or more single or multi-core processors. For example, the one or more processors may include a 3G baseband processor 404A, a 4G/LTE baseband processor 404B, a 5G/NR baseband processor 404C, or some other baseband processor(s) 404D for other existing generations, generations in development or to be developed in the future (e.g., sixth generation (6G), etc.). In other embodiments, some or all of the functionality of baseband processors 404A-D may be included in modules stored in the memory 404G and executed via a Central Processing Unit (CPU) 404E. In other embodiments, some or all of the functionality of baseband processors 404A-D may be provided as hardware accelerators (e.g., FPGAs, ASICs, etc.) loaded with the appropriate bit streams or logic blocks stored in respective memory cells. In various embodiments, the memory 404G may store program code of a real-time OS (RTOS), which when executed by the CPU 404E (or other baseband processor), is to cause the CPU 404E (or other baseband processor) to manage resources of the baseband circuitry 410, schedule tasks, etc. In addition, the baseband circuitry 410 includes one or more audio digital signal processor(s) (DSP) 404F. The audio DSP(s) 404F include elements for compression/decompression and echo cancellation and may include other suitable processing elements in other embodiments.

In some embodiments, each of the processors 404A-404E include respective memory interfaces to send/receive data to/from the memory 404G. The baseband circuitry 410 may further include one or more interfaces to communicatively couple to other circuitries/devices RF circuitry 406 may enable communication with wireless networks using modulated electromagnetic radiation through a non-solid medium.

In some embodiments, the receive signal path of the RF circuitry 406 may include mixer circuitry 406a, amplifier circuitry 406b and filter circuitry 406c. In some embodiments, the transmit signal path of the RF circuitry 406 may include filter circuitry 406c and mixer circuitry 406a. RF circuitry 406 may also include synthesizer circuitry 406d for synthesizing a frequency for use by the mixer circuitry 406a of the receive signal path and the transmit signal path. In some embodiments, the mixer circuitry 406a of the receive signal path may be configured to down-convert RF signals received from the FEM circuitry 408 based on the synthesized frequency provided by synthesizer circuitry 406d. The amplifier circuitry 406b may be configured to amplify the down-converted signals and the filter circuitry 406c may be a low-pass filter (LPF) or band-pass filter (BPF) configured to remove unwanted signals from the down-converted signals to generate output baseband signals. Output baseband signals may be provided to the baseband circuitry 410 for further processing. In some embodiments, the output baseband signals may be zero-frequency baseband signals, although this is not a requirement. In some embodiments, mixer circuitry 406a of the receive signal path may comprise passive mixers, although the scope of the embodiments is not limited in this respect.

FEM circuitry 408 may include a receive signal path, which may include circuitry configured to operate on RF signals received from antenna array 411, amplify the received signals and provide the amplified versions of the received signals to the RF circuitry 406 for further processing. FEM circuitry 408 may also include a transmit signal path, which may include circuitry configured to amplify signals for transmission provided by the RF circuitry 406 for transmission by one or more of antenna elements of antenna array 411. In various embodiments, the amplification through the transmit or receive signal paths may be done solely in the RF circuitry 406, solely in the FEM circuitry 408, or in both the RF circuitry 406 and the FEM circuitry 408.

The antenna array 411 comprises one or more antenna elements, each of which is configured convert electrical signals into radio waves to travel through the air and to convert received radio waves into electrical signals. For example, digital baseband signals provided by the baseband circuitry 410 is converted into analog RF signals (e.g., modulated waveform) that will be amplified and transmitted via the antenna elements of the antenna array 411 including one or more antenna elements (not shown). The antenna elements may be omnidirectional, direction, or a combination thereof. The antenna elements may be formed in a multitude of arranges as are known and/or discussed herein. The antenna array 411 may comprise microstrip antennas or printed antennas that are fabricated on the surface of one or more printed circuit boards. The antenna array 411 may be formed in as a patch of metal foil (e.g., a patch antenna) in a variety of shapes, and may be coupled with the RF circuitry 406 and/or FEM circuitry 408 using metal transmission lines or the like.

One or more of the components of FIGS. 3 and/or 4, may be used in any of the embodiments described herein.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The components of FIGS. 3 and/or 4, such as the shown baseband processing circuitry including processing circuitry and a RF interface, may be used in any of the embodiments described herein, such as in a gNodeB or in a UE.

In some embodiments, the electronic device(s), network(s), system(s), chip(s) or component(s), or portions or implementations thereof, of FIGS. 3 and/or 4, or some other figure herein, may be configured to perform one or more processes, techniques, or methods as described herein, or portions thereof. One such process is depicted in FIG. 5.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

In some embodiments, the electronic device(s), network(s), system(s), chip(s) or component(s), or portions or implementations thereof, of FIGS. 3 and/or 4, or some other figure herein, may be configured to perform one or more processes, techniques, or methods as described herein, or portions thereof.

In some embodiments, the electronic device of FIGS. 3 and/or 4 may be configured to perform one or more processes, techniques, and/or methods as described herein, or portions thereof.

The components of FIGS. 3 and/or 4 may be used in any of the embodiments described herein.

In some embodiments, the electronic device(s), network(s), system(s), chip(s) or component(s), or portions or implementations thereof, of FIGS. 3 and/or 4, or some other figure herein, may be configured to perform one or more processes, techniques, or methods as described herein, or portions thereof.

For one or more embodiments, at least one of the components set forth in one or more of the preceding figures as appropriate may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 includes a device of a New Radio (NR) User Equipment (UE), the device including a radio frequency (RF) interface and processing circuitry coupled to the RF interface, the processing circuitry to: cause communication with a NR evolved Node B (gNodeB) on a first bandwidth part (BWP); determine a BWP switching delay for an uplink (UL) communication from the UE to the gNodeB, the BWP switching delay based on a timing advance (TA) for the UL communication; encode the UL communication for transmission to the gNodeB; switch from the first BWP to a second BWP at an expiration of the BWP switching delay; and cause transmission of the UL communication on the second BWP.

Example 2 includes the subject matter of Example 1, and optionally, wherein the BWP switching delay is based on a Type 1 delay or a Type 2 delay depending on a UE capability for the UE.

Example 3 includes the subject matter of Example 1, and optionally, wherein the BWP switching delay is based on a subcarrier spacing (SCS) of the second BWP or of the first BWP.

Example 4 includes the subject matter of Example 1, and optionally, wherein the BWP switching delay is a first BWP part switching delay, the processing circuitry further to: decode first a downlink control information (DCI) from the gNodeB, the first DCI including a first BWP switching request to switch from the first BWP to the second BWP; decode second a downlink control information (DCI) from the gNodeB, the second DCI including a second BWP switching request to switch from the second BWP to a third BWP; determine a second BWP switching delay for receipt of a downlink (DL) communication from the gNodeB, the BWP switching delay not based on any timing advance (TA); switch from the second BWP to the third BWP at an expiration of the second BWP switching delay; and expect to receive the DL communication on the third BWP.

Example 5 includes the subject matter of Example 1, and optionally, wherein the processing circuitry is to one of: decode a downlink control information (DCI) at slot n from the gNodeB, the DCI including a BWP switching request; or determine at slot n that a BWP-inactivity timer has expired; and switch at an expiration of the BWP switching delay measured from slot n, wherein the BWP switching delay=$T_{BWPswitchDelay}$+Y, wherein Y is based on TA.

Example 6 includes the subject matter of Example 5, and optionally, wherein one of: Y equals a smallest number of slots longer than (TA+TA offset); or Y is based an existing margin in the BWP switching delay.

Example 7 includes the subject matter of Example 6, and optionally, wherein, where Y is based on an existing margin X in the BWP switching delay, the processing circuitry is to: use the margin to compensate a part of TA, wherein any positive remaining part of TA represents a difference between the BWP switching delay an a switching delay associated with DL communications to the UE; and subtract a TA adjustment accuracy from the margin before using the margin to compensate a part of TA.

Example 8 includes the subject matter of Example 6, and optionally, wherein, where Y is based on an existing margin X in the BWP switching delay: if (TA+TA offset)<X, Y is equal to zero; and if (TA+TA offset)≥Y is equal to a smallest number, based on subcarrier spacing (SCS), of slots that is longer than (TA+TA offset−X), wherein X is a value based on SCS and on whether TBWPswitchDelay is a Type 1 delay or a Type 2 delay.

Example 9 includes the subject matter of Example 8, and optionally, wherein X is: for a SCS of 15 kHz, 185.82 for the Type 1 delay and 784.72 for a Type 2 delay; for a SCS of 30 kHz, 292.83 for the Type 1 delay and 392.35 for a Type 2 delay; for a SCS of 60 kHz, 96.41 for the Type 1 delay and 196.17 for a Type 2 delay; and for a SCS of 123.22 kHz, 185.82 for the Type 1 delay and 98.10 for a Type 2 delay.

Example 10 includes the subject matter of Example 1, and optionally, wherein the processing circuitry is to configure the UE with an interruption requirement for an interruption to a UL or DL transmission by the UE caused by a BWP switch from, respectively, a corresponding DL or UL carrier.

Example 11 includes the subject matter of Example 10, and optionally, wherein the interruption requirement includes: for a NR slot length in millisecond of 1, an interruption length of 1 slot; for a NR slot length in millisecond of 0.5, an interruption length of 1 slot; for a NR slot length in millisecond of 0.25, an interruption length of 3 slots; and for a NR slot length in millisecond of 0.125, an interruption length of 5 slots.

Example 12 includes the subject matter of any one of Examples 1-11, and optionally, wherein the processing circuitry is to switch when the UE operates in frequency division duplexing (FDD) mode.

Example 13 includes the subject matter of Example 10, and optionally, wherein the processing circuitry is to configure the UE with an interruption requirement for an interruption to a UL or DL transmission by the UE caused by a BWP switch from, respectively, a corresponding DL or UL carrier, wherein the corresponding DL or UL carrier is on one of an Evolved Universal Mobile Telecommunications System (UMTS) Terrestrial Radio Access (E-UTRA) primary cell (PCell), or on one or more activated Universal Mobile Telecommunications System (UMTS) Terrestrial Radio Access (UTRA) SCells, the interruption requirement including: two subframes in intra-band synchronous Evolved Universal Mobile Telecommunications System Terrestrial Radio Access Network New Radio-Dual Connectivity (EN-DC); and three subframes in intra-band asynchronous EN-DC.

Example 14 includes the subject matter of Example 10, and optionally, wherein: in response to a determination that the processing circuitry is to switch on a NR serving cell in NR carrier aggregation (CA), the processing circuitry configured to, for intra-band carrier aggregation, cause the interruption on one or more serving cells other than the NR serving cell; and in response to a determination that the processing circuitry is to switch on a NR serving cell in Evolved Universal Mobile Telecommunications System Terrestrial Radio Access Network New Radio-Dual Connectivity (EN-DC), the processing circuitry configured to, for intra-band carrier aggregation, cause the interruption on a primary cell (PCell) or on one or more active secondary cells (SCells); wherein the interruption is up to Y slots, and wherein Y is: for a NR slot length in millisecond of 1, an interruption length of 2 slots; for a NR slot length in millisecond of 0.5, an interruption length of 2 slots; for a NR slot length in millisecond of 0.25, an interruption length of 4 slots; and for a NR slot length in millisecond of 0.125, an interruption length of 6 slots.

Example 15 includes the subject matter of Example 1, and optionally, wherein the BWP switching delay is to be further based on a time for automatic gain control (AGC) settling.

Example 16 includes the subject matter of Example 1, and optionally, the processing circuitry to further decode multiple-input multiple-output (MIMO) layer radio resource control (RRC) signaling from the gNodeB including MIMO layer configuration parameters, the RRC signaling being one of per-component-carrier (per-CC)-based and per-BWP-based, wherein, when the RRC signaling is BWP-based, the BWP switching delay is to be further based on a MIMO layer reconfiguration of the UE.

Example 17 includes the subject matter of Example 16, and optionally, wherein the MIMO layer configuration parameters include a maximum MIMO layer configuration.

Example 18 includes the subject matter of any one of Examples 1-17, and optionally, further including a front end module coupled to the RF interface.

Example 19 includes the subject matter of Example 18, and optionally, further including one or more antennas coupled to the front end module to transmit and receive signals at the UE.

Example 20 includes a method to be performed at a device of a New Radio (NR) User Equipment (UE), the method including: causing communication with a NR evolved Node B (gNodeB) on a first bandwidth part (BWP); determining a BWP switching delay for an uplink (UL) communication from the UE to the gNodeB, the BWP switching delay based on a timing advance (TA) for the UL communication; encoding the UL communication for transmission to the gNodeB; switching from the first BWP to a second BWP at an expiration of the BWP switching delay; and causing transmission of the UL communication on the second BWP.

Example 21 includes the subject matter of Example 20, and optionally, wherein the BWP switching delay is based on a Type 1 delay or a Type 2 delay depending on a UE capability for the UE.

Example 22 includes the subject matter of Example 20, and optionally, wherein the BWP switching delay is based on a subcarrier spacing (SCS) of the second BWP or of the first BWP.

Example 23 includes the subject matter of Example 20, and optionally, wherein the BWP switching delay is a first BWP part switching delay, the method including: decoding first a downlink control information (DCI) from the gNodeB, the first DCI including a first BWP switching request to switch from the first BWP to the second BWP; decoding second a downlink control information (DCI) from the gNodeB, the second DCI including a second BWP switching request to switch from the second BWP to a third BWP; determining a second BWP switching delay for receipt of a downlink (DL) communication from the gNodeB, the BWP switching delay not based on any timing advance (TA); switching from the second BWP to the third BWP at an expiration of the second BWP switching delay; and expecting to receive the DL communication on the third BWP.

Example 24 includes the subject matter of Example 20, and optionally, wherein the method includes one of: decoding a downlink control information (DCI) at slot n from the gNodeB, the DCI including a BWP switching request; or determining at slot n that a BWP-inactivity timer has expired; and switching at an expiration of the BWP switching delay measured from slot n, wherein the BWP switching delay=$T_{BWPswitchDelay}$+Y, wherein Y is based on TA.

Example 25 includes the subject matter of Example 24, and optionally, wherein one of: Y equals a smallest number of slots longer than (TA+TA offset); or Y is based an existing margin in the BWP switching delay.

Example 26 includes the subject matter of Example 25, and optionally, wherein, where Y is based on an existing margin X in the BWP switching delay, the method including: using the margin to compensate a part of TA, wherein any positive remaining part of TA represents a difference between the BWP switching delay an a switching delay associated with DL communications to the UE; and subtracting a TA adjustment accuracy from the margin before using the margin to compensate a part of TA.

Example 27 includes the subject matter of Example 25, and optionally, wherein, where Y is based on an existing margin X in the BWP switching delay: if (TA+TA offset)<X, Y is equal to zero; and if (TA+TA offset) Z, Y is equal to a smallest number, based on subcarrier spacing (SCS), of slots that is longer than (TA+TA offset−X), wherein X is a value based on SCS and on whether TBWPswitchDelay is a Type 1 delay or a Type 2 delay.

Example 28 includes the subject matter of Example 27, and optionally, wherein X is: for a SCS of 15 kHz, 185.82 for the Type 1 delay and 784.72 for a Type 2 delay; for a SCS of 30 kHz, 292.83 for the Type 1 delay and 392.35 for a Type 2 delay; for a SCS of 60 kHz, 96.41 for the Type 1 delay and 196.17 for a Type 2 delay; and for a SCS of 123.22 kHz, 185.82 for the Type 1 delay and 98.10 for a Type 2 delay.

Example 29 includes the subject matter of Example 20, and optionally, wherein the method includes configuring the UE with an interruption requirement for an interruption to a UL or DL transmission by the UE caused by a BWP switch from, respectively, a corresponding DL or UL carrier.

Example 30 includes the subject matter of Example 29, and optionally, wherein the interruption requirement includes: for a NR slot length in millisecond of 20, an interruption length of 1 slot; for a NR slot length in millisecond of 0.5, an interruption length of 1 slot; for a NR slot length in millisecond of 0.25, an interruption length of 3 slots; and for a NR slot length in millisecond of 0.125, an interruption length of 5 slots.

Example 31 includes the subject matter of any one of Examples 20-30, and optionally, wherein the method includes switching when the UE operates in frequency division duplexing (FDD) mode.

Example 32 includes the subject matter of Example 29, and optionally, wherein the method includes configuring the UE with an interruption requirement for an interruption to a UL or DL transmission by the UE caused by a BWP switch from, respectively, a corresponding DL or UL carrier, wherein the corresponding DL or UL carrier is on one of an Evolved Universal Mobile Telecommunications System (UMTS) Terrestrial Radio Access (E-UTRA) primary cell (PCell), or on one or more activated Universal Mobile Telecommunications System (UMTS) Terrestrial Radio Access (UTRA) SCells, the interruption requirement including: two subframes in intra-band synchronous Evolved Universal Mobile Telecommunications System Terrestrial Radio Access Network New Radio-Dual Connectivity (EN-DC); and three subframes in intra-band asynchronous EN-DC.

Example 33 includes the subject matter of Example 29, and optionally, further including: in response to a determination that switching is on a NR serving cell in NR carrier aggregation (CA), for intra-band carrier aggregation, causing the interruption on one or more serving cells other than the NR serving cell; and in response to a determination switching is on a NR serving cell in Evolved Universal Mobile Telecommunications System Terrestrial Radio Access Network New Radio-Dual Connectivity (EN-DC), for intra-band carrier aggregation, causing the interruption on a primary cell (PCell) or on one or more active secondary cells (SCells); wherein the interruption is up to Y slots, and wherein Y is: for a NR slot length in millisecond of 20, an interruption length of 2 slots; for a NR slot length in millisecond of 0.5, an interruption length of 2 slots; for a NR slot length in millisecond of 0.25, an interruption length of 4 slots; and for a NR slot length in millisecond of 0.125, an interruption length of 6 slots.

Example 34 includes the subject matter of Example 29, and optionally, wherein the BWP switching delay is to be further based on a time for automatic gain control (AGC) settling.

Example 35 includes the subject matter of Example 29, and optionally, the method including decoding multiple-input multiple-output (MIMO) layer radio resource control (RRC) signaling from the gNodeB including MIMO layer configuration parameters, the RRC signaling being one of per-component-carrier (per-CC)-based and per-BWP-based, wherein, when the RRC signaling is BWP-based, the BWP switching delay is to be further based on a MIMO layer reconfiguration of the UE.

Example 36 includes the subject matter of Example 35, and optionally, wherein the MIMO layer configuration parameters include a maximum MIMO layer configuration.

Example 37 includes a device of a New Radio (NR) User Equipment (UE), the device: means for causing communication with a NR evolved Node B (gNodeB) on a first bandwidth part (BWP); means for determining a BWP switching delay for an uplink (UL) communication from the UE to the gNodeB, the BWP switching delay based on a timing advance (TA) for the UL communication; means for encoding the UL communication for transmission to the gNodeB; means for switching from the first BWP to a second BWP at an expiration of the BWP switching delay; and means for causing transmission of the UL communication on the second BWP.

Example 38 includes the subject matter of Example 37, and optionally, wherein the BWP switching delay is based on a Type 1 delay or a Type 2 delay depending on a UE capability for the UE.

Example 39 includes the subject matter of Example 37, and optionally, wherein the BWP switching delay is based on a subcarrier spacing (SCS) of the second BWP or of the first BWP.

Example 40 includes a device of a New Radio (NR) evolved Node B (gNodeB), the device including a radio frequency (RF) interface and processing circuitry coupled to the RF interface, the processing circuitry to: determine that a NR User Equipment (UE) is to switch to a new active bandwidth part (BWP) for communication on a primary cell (PCell) or on one or more activated secondary cells (SCells) on which the UE is configured for intra-band Evolved Universal Mobile Telecommunications System (UMTS) Terrestrial Radio Access (E-UTRA) NR Duel Connectivity (EN-DC) communication; and interrupt service to the UE on at least one of the PCell or the one or more activated SCells for an interruption time period based on a switch by the UE to the new active BWP, and further based on the UE being configured for intra-band EN-DC with the PCell and the one or more activated SCells.

Example 41 includes the subject matter of Example 40, and optionally, further including encoding for transmission to the UE a downlink control information (DCI), the DCI including a BWP switching request to the UE.

Example 42 includes the subject matter of Example 40, and optionally, wherein the interruption time period includes: two subframes in intra-band synchronous EN-DC; and three subframes in intra-band asynchronous EN-DC.

Example 43 includes the subject matter of Example 40, and optionally, wherein the time period is 500 microseconds.

Example 44 includes the subject matter of Example 40, and optionally, wherein the processing circuitry is to interrupt service to the UE on the PCell and on the one or more activated SCells.

Example 45 includes the subject matter of Example 40, and optionally, wherein the processing circuitry is to interrupt service to the UE on a plurality of the one or more activated SCells.

Example 46 includes the subject matter of Example 40, and optionally, wherein: in response to a determination that the UE is to switch on a NR serving cell in NR carrier aggregation (CA), the processing circuitry configured to, for intra-band carrier aggregation, cause the interruption on the one or more activated SCells other than the NR serving cell; and in response to a determination that the UE is to switch on a NR serving cell in EN-DC, the processing circuitry configured to, for intra-band carrier aggregation, cause the interruption on the PCell or on the one or more activated SCells; wherein the interruption is up to Y slots, and wherein Y is: for a NR slot length in millisecond of 1, an interruption length of 2 slots; for a NR slot length in millisecond of 0.5, an interruption length of 2 slots; for a NR slot length in millisecond of 0.25, an interruption length of 4 slots; and for a NR slot length in millisecond of 0.125, an interruption length of 6 slots.

Example 47 includes the subject matter of any one of Examples 40-46, and optionally, further including a front end module coupled to the RF interface.

Example 48 includes the subject matter of Example 47, and optionally, further including one or more antennas coupled to the front end module to transmit and receive signals at the UE.

Example 49 includes a machine readable medium including code which, when executed, is to cause a machine to perform the method of any one of Examples 20-36.

Example 50 includes a bandwidth part (BWP) switching delay requirement for UL transmission defined in TS38.133 that further takes timing advance (TA) into account.

Example 51 includes, when BWP switch occurs in UL and UE operates on FDD mode, after UE receives a BWP switching request at DL slot n (for DCI-based BWP switch), or the BWP-inactivity timer expires at DL slot n (for timer-based BWP switch), a UE able to transmit PUSCH (for UL active BWP switch) on the new BWP no later than at UL slot n+TBWPswitchDelay+Y, where TBWPswitchDelay defined in Table 8.6.2-1 in TS38.133. In this Example, there are two options for values of Y:

Option 1: Y equals to the smallest number of slots (depending on SCS) that longer than (TA+TA offset);

Option 2: Y is calculated by taking into account the existing margin in BWP switching delay.
Y equals to zero if (TA+TA offset)<X;
Y equals to the smallest number of slots (depending on SCS) that longer than (TA+TA offset−X) if (TA+TA offset)≥X.
wherein X is defined in Table 3 shown below

TABLE 1

X values for UL BWP switching delay

| SCS | For Type 1 Delay UE (µs) | For Type 2 Delay UE (µs) |
|---|---|---|
| 15 kHz | 185.82 | 784.72 |
| 30 kHz | 292.83 | 392.35 |
| 60 kHz | 96.41 | 196.17 |
| 120 kHz | 123.22 | 98.10 |

Example 52 includes, when UE operates in FDD mode, a BWP switch in DL (or UL) carrier that cause interruption to the corresponding UL (or DL) carriers. The interruption requirement in this Example is the same as BWP switching in inter-band CA specified in the table below.

TABLE 2

Interruption length

| NR/Slot length (ms) | Interruption length (slots) |
|---|---|
| 1 | 1 |
| 0.5 | 1 |
| 0.25 | 3 |
| 0.125 | 5 |

Example 53 includes the interruption on E-UTRA PCell or on any activated E-UTRA SCell(s) due to BWP switching in any NR serving cell to be:
2 subframes in intra-band synchronous EN-DC and
3 subframes in intra-band asynchronous EN-DC.
When BWP switch occurs on the NR serving cell in NR CA, the UE is allowed to cause interruption of up to Y on the other active serving cell for intra-band CA. When BWP switch occurs on the NR serving cell in EN-DC, the UE is allowed to cause interruption of up to Y on PCell or on the other active SCell for intra-band EN-DC. Y is defined in Table 3.

TABLE 3

Interruption duration Y

| µ | NR Slot length (ms) | Interruption length |
|---|---|---|
| 0 | 1 | 2 |
| 1 | 0.5 | 2 |
| 2 | 0.25 | 4 |
| 3 | 0.125 | 6 |

Example 54 includes MIMO layer RRC signaling that is per-CC based.

Example 55 includes a method comprising: determining that a user equipment (UE) is to switch a new active bandwidth part for uplink transmission; and determining a delay for starting uplink transmissions on the new active bandwidth part, wherein the delay is determined based on a timing advance associated with the UE.

Example 56 includes the method of Example 55, wherein the delay is further determined based on the delay being a Type 1 or a Type 2 delay.

Example 57 includes the method of Example 56, further comprising determining the delay is Type 1 or Type 2 based on UE capability.

Example 58 includes the method of any of Examples 55-57, wherein the delay is further determined based on a subcarrier spacing (SCS) of the new bandwidth part or a preceding bandwidth part.

Example 59 includes the method of any of Examples 55-58, wherein the DCI message is a first DCI Message, wherein the new bandwidth part is a first new bandwidth part, and wherein the method further comprises: receiving another DCI message to instruct the UE to switch an active bandwidth part for downlink signals to a new bandwidth part; and determining a second delay for availability of downlink signals on the second new bandwidth part without regard to the timing advance.

Example 60 includes the method of any of Examples 55-58, wherein the delay is determined according to $T_{BWPswitchDelay}+Y$, wherein Y is based on the timing advance.

Example 61 includes the method of Example 60, wherein $T_{BWPswitchDelay}$ is defined according to Table 8.6.2-1.

Example 62 includes the method of Example 60 or 61, wherein Y is a smallest number of slots that are longer than the timing advance plus a timing advance offset.

Example 63 includes the method of Example 60 or 61, wherein: if a timing advance plus a timing advance offset is less than $T_{BWPswitchDelay}$, then Y equals 0; and if a timing advance plus a timing advance offset is greater than $T_{BWPswitchDelay}$, then Y equals the smallest number of slots that are longer than the timing advance plus a timing advance offset minus $T_{BWPswitchDelay}$.

Example 64 includes the method of Example 60 or 61, wherein X is a margin in bandwidth part switching delay without regard to the timing advance, and wherein: if a timing advance plus a timing advance offset is less than X, then Y equals 0; and if a timing advance plus a timing advance offset is greater than X, then Y equals the smallest number of slots that are longer than the timing advance plus a timing advance offset minus X.

Example 65 includes the method of Example 64, wherein X has a value according to Table 1.

Example 66 includes the method of any of Examples 55-65, the determining is based on a downlink control information (DCI) message received by the UE.

Example 67 includes the method of any of Examples 55-65, wherein the determining is based on expiration of a timer.

Example 68 includes the method of any of Examples 55-67, wherein the timing advance includes an accuracy adjustment.

Example 69 includes the method of any of Examples 55-68, further comprising interrupting service on a corresponding downlink carrier responsive to the switch to the new active bandwidth part.

Example 70 includes the method of claim 69, wherein the corresponding downlink carrier is associated with a same cell as the new active bandwidth part.

Example 71 includes the method of any of Examples 55-70, wherein the time period includes time to change MIMO layer parameters.

Example 72 includes the method of any of Examples 55-70, wherein the method is performed when the UE operates in a frequency-division duplexing (FDD) mode.

Example 73 includes the method of any of Examples 55-72, wherein the method is performed by the UE or a portion thereof.

Example 74 includes the method of Example 73, further comprising transmitting an uplink signal after the delay.

Example 75 includes the method of any of Examples 55-72, wherein the method is performed by a next generation base station (gNB), another network entity, or a portion thereof.

Example 76 includes a method comprising: determining that a user equipment (UE) is to switch to a new active bandwidth part for communication on a primary cell (PCell) or an activated secondary cell (SCell) on which the UE is configured for intra-band E-UTRA New Radio Dual Connectivity (EN-DC); and interrupting service on the PCell or the activated SCell for a time period based on the switch to the new active bandwidth part and based on the UE being configured for intra-band EN-DC with the PCell and the activated SCell.

Example 77 includes the method of Example 76, wherein the time period is: 2 subframes if the UE is configured for intra-band synchronous EN-DC; or 3 subframes if the UE is configured for intra-band asynchronous EN-DC.

Example 78 includes the method of Example 76, wherein the time period is determined according to Table 5.

Example 79 includes the method of Example 76, wherein the time period is 500 microseconds.

Example 80 includes the method of any of Examples 75-79, wherein the service is interrupted on the PCell and the activated SCell.

Example 81 includes the method of any of Examples 75-80, wherein the service is interrupted on multiple activated SCells.

Example 82 includes the method of any of Examples 75-81, wherein the time period includes a time for automatic gain control (AGC) settling.

Example 83 includes the method of any of Examples 75-80, wherein the time period includes time to change MIMO layer parameters.

Example 84 includes the method of any of Examples 75-83, wherein the method is performed by the UE or a portion thereof.

Example 85 includes the method of any of Examples 55-83, wherein the method is performed by a next generation base station (gNB), another network entity, or a portion thereof.

Example 86 includes a method comprising: receiving a radio resource control (RRC) message including multiple-input multiple-output (MIMO) configuration parameters for a component carrier; and communicating on the component carrier based on the MIMO configuration parameters.

Example 87 includes the method of Example 86, wherein the MIMO configuration parameters include a maximum MIMO layer configuration.

Example 88 includes the method of Example 86 or 87, wherein communicating on the component carrier includes performing bandwidth part switching between bandwidth parts of the component carrier.

Example 89 includes the method of any of Examples 86-88, wherein the MIMO configuration parameters apply to multiple bandwidth parts of the component carrier.

Example 90 includes the method of any of Examples 86-89, wherein the method is performed by a UE or a portion thereof.

Example 91 includes a method comprising: transmitting or causing to transmit, to a user equipment (UE), a radio resource control (RRC) message including multiple-input multiple-output (MIMO) configuration parameters for a component carrier; and communicating with the UE on the component carrier based on the MIMO configuration parameters.

Example 92 includes the method of Example 91, wherein the MIMO configuration parameters include a maximum MIMO layer configuration.

Example 93 includes the method of Example 91 or 92, wherein communicating on the component carrier with the UE includes performing bandwidth part switching between bandwidth parts of the component carrier.

Example 94 includes the method of any of Examples 91-93, wherein the MIMO configuration parameters apply to multiple bandwidth parts of the component carrier.

Example 95 includes the method of any of Examples 91-93, wherein the method is performed by a next generation base station (gNB) or a portion thereof.

Example 96 includes an apparatus comprising means to perform one or more elements of a method described in or related to any of Examples 50-95, or any other method or process described herein.

Example 97 includes one or more non-transitory computer-readable media comprising instructions to cause an electronic device, upon execution of the instructions by one or more processors of the electronic device, to perform one or more elements of a method described in or related to any of Examples 50-95, or any other method or process described herein.

Example 98 includes an apparatus comprising logic, modules, or circuitry to perform one or more elements of a method described in or related to any of Examples 50-95, or any other method or process described herein.

Example 99 includes a method, technique, or process as described in or related to any of Examples 50-95, or portions or parts thereof.

Example 100 includes an apparatus comprising: one or more processors and one or more computer-readable media comprising instructions that, when executed by the one or more processors, cause the one or more processors to perform the method, techniques, or process as described in or related to any of Examples 50-95, or portions thereof.

Example 101 includes a signal as described in or related to any of the Examples herein, or portions or parts thereof.

Example 102 includes a signal in a wireless network as shown and described herein.

Example 103 includes a method of communicating in a wireless network as shown and described herein.

Example 104 includes a system for providing wireless communication as shown and described herein.

Example 105 includes a device for providing wireless communication as shown and described herein.

Example 106 includes a product comprising one or more tangible computer-readable non-transitory storage media comprising computer-executable instructions operable to, when executed by at least one computer processor, enable the at least one computer processor to perform the method of any one of the method Examples above.

Example 107 includes an apparatus comprising means for causing a wireless communication device to perform the method of any one of the method Examples above.

Example 108 includes a signal as described in or related to any of the examples above, or portions or parts thereof.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed.

What is claimed is:

1. A baseband processor, configured to perform operations comprising:
   receiving radio resource control (RRC) signaling of per bandwidth part (BWP) configurations comprising a first configuration of a first BWP including a multiple input multiple output (MIMO) parameter and a second configuration of a second BWP including the MIMO parameter;
   causing communication with a base station on the first BWP according to the first configuration;
   initiating a BWP switch from the first BWP to the second BWP;
   determining whether an interruption for the BWP switch is allowed based on whether a value of the MIMO parameter in the first configuration is different from a value of the MIMO parameter in the second configuration, wherein the interruption defines a time period during which communication with the base station is not performed, wherein
      the interruption is not allowed when the value of the MIMO parameter in the first configuration is the same as the value of the MIMO parameter in the second configuration; and
      the interruption is allowed when the value of the MIMO parameter in the first configuration is different from the value of the MIMO parameter in the second configuration;
   switching from the first BWP to the second BWP; and
   after the determined interruption, causing communication with the base station on the second BWP.

2. The baseband processor of claim 1, wherein the operations comprise initiating the BWP switch in response to a downlink control information including a switching request that indicates a switch from the first BWP to the second BWP.

3. The baseband processor of claim 1, wherein the operations comprise initiating the BWP switch in response to expiration of a timer associated with BWP switching.

4. The baseband processor of claim 1, wherein the BWP switching delay is a first BWP art switching delay, wherein the operations comprise:
   determining a BWP switching delay for an uplink (UL) communication from a user equipment (UE) to the base station, the BWP switching delay based on a timing advance (TA) for the UL communication;
   decoding a first downlink control information (DCI) from the base station, the first DCI including a first BWP switching request to switch from the first BWP to the second BWP;
   switching from the first BWP to the second BWP at an expiration of the BWP switching delay;
   decoding a second downlink control information (DCI) from the base station, the second DCI including a second BWP switching request to switch from the second BWP to a third BWP;
   determining a second BWP switching delay for receipt of a downlink (DL) communication from the base station, the BWP switching delay not based on any timing advance (TA);
   switching from the second BWP to the third BWP at an expiration of the second BWP switching delay; and
   expecting to receive the DL communication on the third BWP.

5. The baseband processor of claim 4, wherein the operations comprise:
    decoding a downlink control information (DCI) at slot n from the base station, the DCI including a BWP switching request; or
    determining at slot n that a BWP-inactivity timer has expired; and
    switching at an expiration of the BWP switching delay measured from slot n, wherein the BWP switching delay=$T_{BWP}$switchDelay+Y, wherein Y is based on TA.

6. The baseband processor of claim 5, wherein one of:
    Y equals a smallest number of slots longer than (TA+TA offset); or
    Y is based on an existing margin in the BWP switching delay.

7. The baseband processor of claim 6, wherein, where Y is based on an existing margin in the BWP switching delay, wherein the operations comprise:
    using the existing margin to compensate a part of TA, wherein any positive remaining part of TA represents a difference between the BWP switching delay an a switching delay associated with DL communications to a UE; and
    subtracting a TA adjustment accuracy from the existing margin before using the existing margin to compensate a part of TA.

8. The baseband processor of claim 6, wherein, where Y is based on an existing margin X in the BWP switching delay:
    if (TA+TA offset)<X, Y is equal to zero; and
    if (TA+TA offset)>, Y is equal to a smallest number, based on subcarrier spacing (SCS), of slots that is longer than (TA+TA offset−X), wherein X is a value based on SCS and on whether TBWPswitchDelay is a Type 1 delay or a Type 2 delay.

9. The baseband processor of claim 8, wherein X is:
    for a SCS of 15 kHz, 185.82 for the Type 1 delay and 784.72 for a Type 2 delay;
    for a SCS of 30 kHz, 292.83 for the Type 1 delay and 392.35 for a Type 2 delay;
    for a SCS of 60 KHz, 96.41 for the Type 1 delay and 196.17 for a Type 2 delay; and
    for a SCS of 123.22 kHz, 185.82 for the Type 1 delay and 98.10 for a Type 2 delay.

10. The baseband processor of claim 1, wherein the operations comprise configuring a UE with an interruption requirement based on the determined interruption.

11. The baseband processor of claim 10, wherein the interruption requirement includes:
    for a NR slot length in millisecond of 1, an interruption length of 1 slot;
    for a NR slot length in millisecond of 0.5, an interruption length of 1 slot;
    for a NR slot length in millisecond of 0.25, an interruption length of 3 slots; and
    for a NR slot length in millisecond of 0.125, an interruption length of 5 slots.

12. The baseband processor of claim 10, wherein the operations comprise configuring with an interruption requirement for an interruption to a UL or DL transmission by the UE caused by a BWP switch from, respectively, a corresponding DL or UL carrier, wherein the corresponding DL or UL carrier is on one of an Evolved Universal Mobile Telecommunications System (UMTS) Terrestrial Radio Access (E-UTRA) primary cell (PCell), or on one or more activated Universal Mobile Telecommunications System (UMTS) Terrestrial Radio Access (UTRA) SCells, the interruption requirement including:
    two subframes in intra-band synchronous Evolved Universal Mobile Telecommunications System Terrestrial Radio Access Network New Radio-Dual Connectivity (EN-DC); and
    three subframes in intra-band asynchronous EN-DC.

13. The baseband processor of claim 10, wherein the operations comprise:
    in response to a determination that the baseband processor is to switch on a NR serving cell in NR carrier aggregation (CA), for intra band carrier aggregation, causing the interruption on one or more serving cells other than the NR serving cell; and
    in response to a determination that the baseband processor is to switch on a NR serving cell in Evolved Universal Mobile Telecommunications System Terrestrial Radio Access Network New Radio-Dual Connectivity (EN-DC), for intra-band carrier aggregation, causing the interruption on a primary cell (PCell) or on one or more active secondary cells (SCells);
    wherein the interruption is up to Y slots, and wherein Y is:
    for a NR slot length in millisecond of 1, an interruption length of 2 slots;
    for a NR slot length in millisecond of 0.5, an interruption length of 2 slots;
    for a NR slot length in millisecond of 0.25, an interruption length of 4 slot; and
    for a NR slot length in millisecond of 0.125, an interruption length of 6 slots.

14. A method, comprising:
    receiving radio resource control (RRC) signaling of per bandwidth part (BWP) configurations comprising a first configuration of a first BWP including a multiple input multiple output (MIMO) parameter and a second configuration of a second BWP including the MIMO parameter;
    causing communication with a base station on first bandwidth part (BWP) according to the first configuration;
    initiating a switch from the first BWP to the second BWP;
    determining whether an interruption for the BWP switch is allowed based on whether a value of the MIMO parameter in the first configuration is different from a value of the MIMO parameter in the second configuration, wherein the interruption defines a time period during which communication with the base station is not performed, wherein
        the interruption is not allowed when the value of the MIMO parameter in the first configuration is the same as the value of the MIMO parameter in the second configuration; and
        the interruption is allowed when the value of the MIMO parameter in the first configuration is different from the value of the MIMO parameter in the second configuration;
    switching from the first BWP to the second BWP; and
    after the allowed determined interruption, causing communication with the base station on the second BWP.

15. The method of claim 14, comprising
    initiating the BWP switch in response to decoding a first downlink control information (DCI) from the base station, the first DCI including a first BWP switching request to switch from the first BWP to the second BWP.

16. The method of claim 14, comprising
    initiating the BWP switch in response to determining that a BWP-inactivity timer has expired.

17. A User Equipment (UE), comprising a memory and a baseband processor coupled to the memory, the processor configured to, when executing instructions stored in the memory, cause the UE to:
- receive radio resource control (RRC) signaling of per bandwidth part (BWP) configurations comprising a first configuration of a first BWP including a multiple input multiple output (MIMO) parameter and a second configuration of a second BWP including the MIMO parameter;
- communicate with a base station on the first BWP according to the first configuration;
- initiate a BWP switch from the first BWP to the second BWP;
- determine whether an interruption for the BWP switch is allowed based on whether a value of the MIMO parameter in the first configuration is different from a value of the MIMO parameter in the second configuration, wherein the allowed interruption defines a time period during which communication with the base station is not performed, wherein
  - the interruption is not allowed when the value of the MIMO parameter in the first configuration is the same as the value of the MIMO parameter in the second configuration; and
  - the interruption is allowed when the value of the MIMO parameter in the first configuration is different from the value of the MIMO parameter in the second configuration;
- switch from the first BWP to the second BWP; and
- after the determined interruption, cause communication with the base station on the second BWP.

18. The UE of claim 17, wherein the baseband processor is configured to initiate the BWP switch in response to receiving downlink control information (DCI) that includes a BWP switching request for switching from the first BWP the second BWP.

19. The UE of claim 17 wherein the baseband processor is configured to initiate the BWP switch in response to expiration of a BWP inactivity timer.

* * * * *